(12) United States Patent
Lo et al.

(10) Patent No.: US 8,131,987 B2
(45) Date of Patent: Mar. 6, 2012

(54) VIRTUAL APPLIANCE PRE-BOOT AUTHENTICATION

(75) Inventors: Yuan-Chang Lo, Austin, TX (US);
Aaron Merkin, Round Rock, TX (US);
Abeye Teshome, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 625 days.

(21) Appl. No.: 12/331,525

(22) Filed: Dec. 10, 2008

(65) Prior Publication Data
US 2010/0146251 A1    Jun. 10, 2010

(51) Int. Cl.
G06F 9/00 (2006.01)
G06F 11/30 (2006.01)
G06F 11/00 (2006.01)
G06F 7/04 (2006.01)

(52) U.S. Cl. .................. 713/2; 713/190; 726/17; 726/22

(58) Field of Classification Search .................... 726/17, 726/22; 713/2, 190
See application file for complete search history.

(56) References Cited

U.S. PATENT DOCUMENTS

2002/0174353 A1    11/2002    Lee
(Continued)

*Primary Examiner* — Mohammad Reza
(74) *Attorney, Agent, or Firm* — Haynes and Boone, LLP

(57) ABSTRACT

A system for pre-boot authentication of a virtual appliance includes one or more subsystems to receive a command to power-on an information handling system (IHS). After receiving the command to power-on the IHS, the system initializes a power-on self test (POST), passes control of the IHS to a hypervisor, loads a concurrent service environment (CSE), requests user credentials, receives user credentials, authenticates user credentials using the CSE and authorizes a specific operating system image from a plurality of images to run on the IHS via the virtual appliance after the user credentials are authenticated.

20 Claims, 3 Drawing Sheets

U.S. PATENT DOCUMENTS

| | | |
|---|---|---|
| 2006/0010317 A1 | 1/2006 | Lee |
| 2008/0022367 A1 | 1/2008 | Dailey et al. |
| 2009/0044265 A1* | 2/2009 | Ghosh et al. .................... 726/14 |
| 2009/0199116 A1* | 8/2009 | von Eicken et al. .......... 715/764 |
| 2009/0204964 A1* | 8/2009 | Foley et al. ....................... 718/1 |
| 2009/0300057 A1* | 12/2009 | Friedman ..................... 707/102 |
| 2010/0153697 A1 | 6/2010 | Ford et al. |
| 2010/0306773 A1* | 12/2010 | Lee et al. .......................... 718/1 |

* cited by examiner

VIRTUAL APPLIANCE PRE-BOOT AUTHENTICATION

BACKGROUND

The present disclosure relates generally to information handling systems, and more particularly to virtual appliance pre-boot authentication using an information handing system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS platform may be used by different users at different times. Current practice is generally for the platform to have a single operating system and for the operating system to be responsible for implementing authentication and authorization for the different users. That is, the platform will boot to a production operating system. The production operating system will then prompt the user for credentials and receive those credentials. The inputting of credentials at this level exposes the operating system to potential malicious attacks.

To improve the security of the platform, systems may require either a power on password or a hard disk password. However, both of these are credentials relating to a single user for the system. If authenticated, the system will boot a default operating system.

Embedded hypervisors on client platforms are starting to come to market. A hypervisor may be known as a virtual machine monitor and is a virtualization platform that allows multiple operating systems to run concurrently on a host IHS. In other words, the hypervisor enables more than one operating system to execute concurrently on a platform. As a result, client platforms are starting to be deployed with multiple operating systems. Two configurations are anticipated to become prevalent. The first configuration is a quick starting webtop/mail client constrained operating system side by side with a production operating system. The second configuration is for two full featured production operating systems to co-exist. One operating system may be a personal or unsecured image. The other operating system may be a highly secure, corporate image. In order to improve the utility of the platform, it is desirable to allow the quick starting and personal operating systems to be booted with minimal or no authentication required, while enforcing pre boot authentication for the secure, corporate image.

Accordingly, it would be desirable to provide an improved virtual appliance pre-boot authentication system absent the disadvantages discussed above.

SUMMARY

According to one embodiment, a system for pre-boot authentication of a virtual appliance includes one or more subsystems to receive a command to power-on an information handling system (IHS). After receiving the command to power-on the IHS, the system initializes a power-on self test (POST), passes control of the IHS to a hypervisor, loads a concurrent service environment (CSE), requests user credentials, receives user credentials, authenticates user credentials using the CSE and authorizes a specific operating system image from a plurality of images to run on the IHS via the virtual appliance after the user credentials are authenticated.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
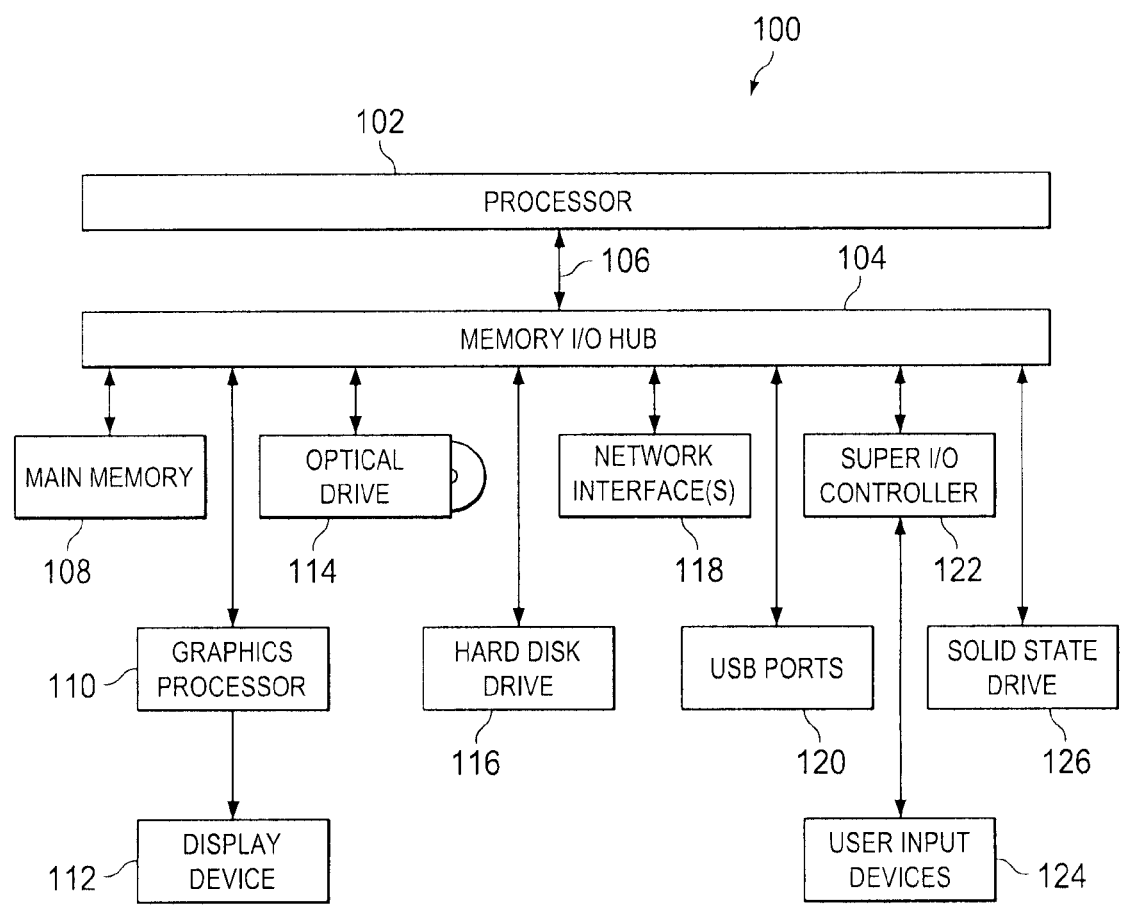
FIG. 1 illustrates a block diagram of an embodiment of an information handling system.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
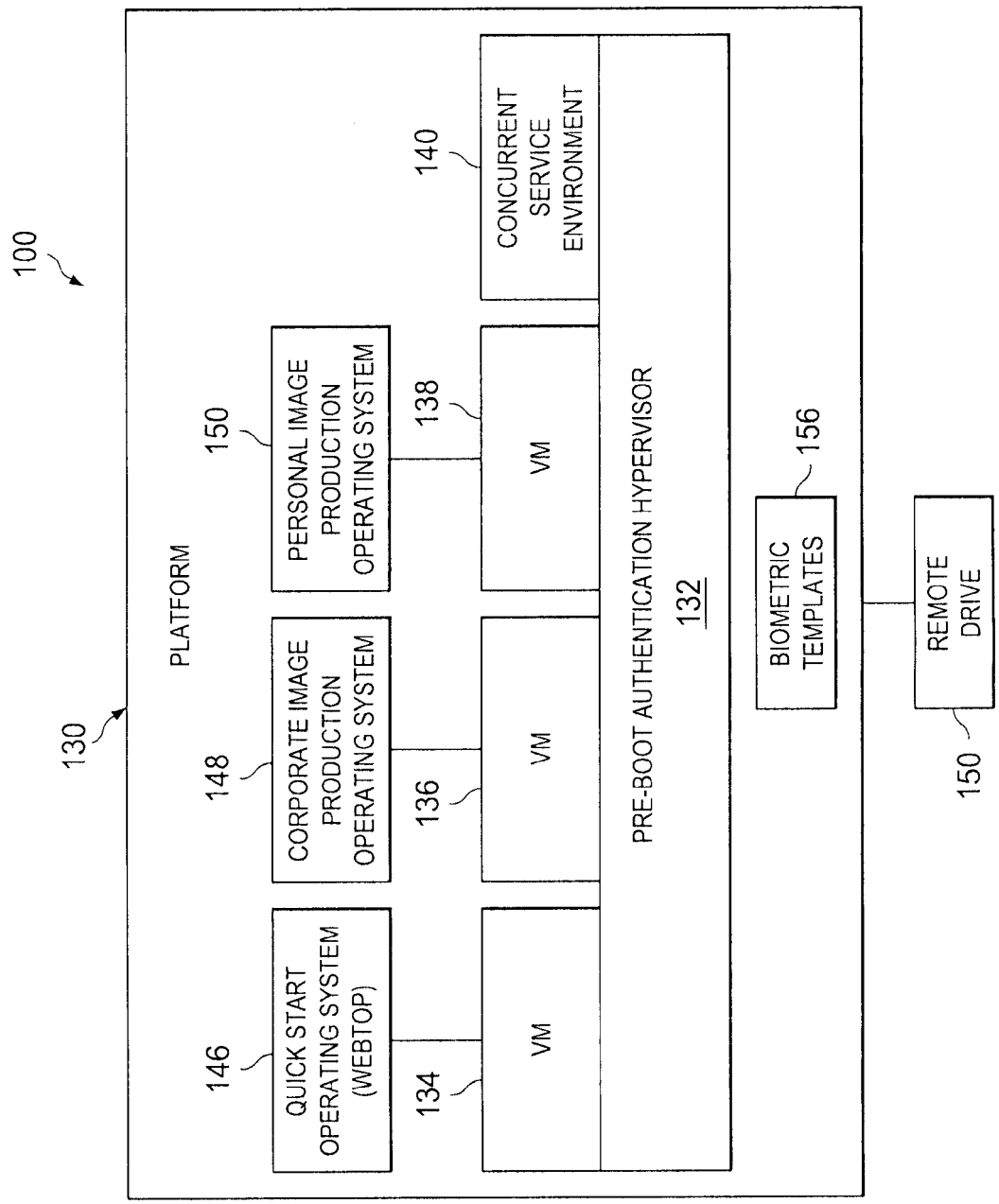
FIG. 2 illustrates a block diagram of a platform for a virtual appliance pre-boot authentication system.

FIG. 2 illustrates a block diagram of a platform 130 for a virtual appliance pre-boot authentication system incorporated into an IHS 100. A platform, such as the platform 130, is to be understood as an IHS hardware architecture and/or software framework, including application frameworks, that allows the software to run on an IHS, such as the IHS 100. A platform may include an IHS's architecture, operating system, programming languages and related runtime libraries and/or graphical user interface. In an embodiment, the platform 130 includes a hypervisor 132, virtual machines 134, 136 and 138 and a concurrent service environment 140. A hypervisor is a virtual machine monitor and is a virtualization platform that allows multiple operating systems, such as the quick start operating system (QUOS) 146, the corporate image production operating system 148 and the personal image production operating system 150, to run concurrently on a host, such as the IHS 100. In other words, the hypervisor 132 may enable more than one operating system (e.g., 146, 148 and/or 150) to execute concurrently on the platform 130. Any type of operating system and any number of operating systems may run on the platform 130. Any type and any number of virtual machines may run on the platform 130. As should be clear, the present disclosure provides pre boot authentication for users of the IHS 100.

A virtual machine is generally understood in the art to be a software implementation of an IHS that executes programs/applications like a real/physical IHS (e.g., the IHS 100). In an embodiment, the virtual machine 134 operates the QUOS operating system 146 under the supervision of the hypervisor 132. In an embodiment, the virtual machine 136 operates the corporate image operating system 148 under the supervision of the hypervisor 132. The corporate image operating system 148 may be a production operating system or may be custom operating system. In an embodiment, the virtual machine 138 operates the personal image operating system 150 under the supervision of the hypervisor 132. The personal image operating system 150 may be a production operating system or may be custom operating system. The present disclosure is presented with the personal image operating system 150 requiring relatively low security/credentials for booting and the corporate image operating system 148 requiring relatively high security/credentials for booting. However, it should be readily understood that any level of security/credentials may be required for any of the virtual machines 134, 136, 138 and the operating systems 146, 148, 150 to boot. In an embodiment, the systems 134/146, 136/148 and 138/150 may boot from a local drive, such as the hard disk drive 116 or the solid state drive 126, or may boot from a remote drive 150.

To provide security/credentials for the platform 130, a user may be required to input a password, input biometric data, or any other type of security measure. A password may be entered using the user input devices 124, an interactive display device 112 or using any other system for entering the data into the IHS 100. Biometric templates 156 may be used to store biometric data on specific users. In an embodiment, a user may use biometric input devices for inputting finger prints, eye scans or any other type of biometric data for authentication of the user. With the user security data/authentication credentials, the platform using the CSE 140 allows the platform 130 to load the proper virtual machine 134, 136, 138 and the corresponding proper operating system 146, 148, 150 for the given user's security level. As such, the corporate image 148 may require a higher level of security than a personal image 150. The hypervisor 132 and/or the CSE 140 may be implemented as secure code.

In an embodiment, the CSE 140 runs on top of the hypervisor 132. This CSE 140 is responsible for interfacing with the authentication components (e.g., fingerprint readers, contact-less smart cards, contact cards, facial recognition, direct entry of password via keyboard, etc.) and implement the authentication policy. The CSE 140 instructs the hypervisor 132 as to which operating system or systems (e.g., 146, 148 and/or 150) to boot depending on the credentials presented. In one embodiment, a basic input/output system (BIOS) passes control to the hypervisor 132, the hypervisor 132 boots the CSE 140. The hypervisor 132 then awaits instructions from the CSE 140. In an embodiment, the CSE 140 has control over the authentication devices of the platform. As should be understood, an embodiment of the present disclosure provides for authentication using a client hosted virtualization implementation where the authentication is performed within the CSE 140, and not in the BIOS, the system firmware or the hypervisor 132. In an embodiment, user credentials are authenticated before any of the operating systems (e.g., 146, 148 and 150) are up and running.

In operation, an end user may attempt to authenticate with the platform 130. If authentication is successful, the CSE 140 will implement the configured policy and instruct the hypervisor 132 to boot the appropriate operating system or operating systems 146, 148 and/or 150. In other words, the CSE 140 will instruct which virtual machine (e.g., 134, 136 and/or 138 to run, which will in turn, determine what image the user will be provided. In an embodiment, the system may allow an Internet/webtop or insecure operating system to boot without awaiting authentication. In an embodiment, the system may allow the webtop/insecure operating system to boot for any user that authenticates successfully with the platform. In an embodiment, the system may integrate with anti-theft technology by allowing functional operating system to boot only when theft has not been detected. The anti-theft technology may be based on physical location of the IHS 100, a provided threat level, and/or on any other anti-theft technology.

Figures 3, 4:
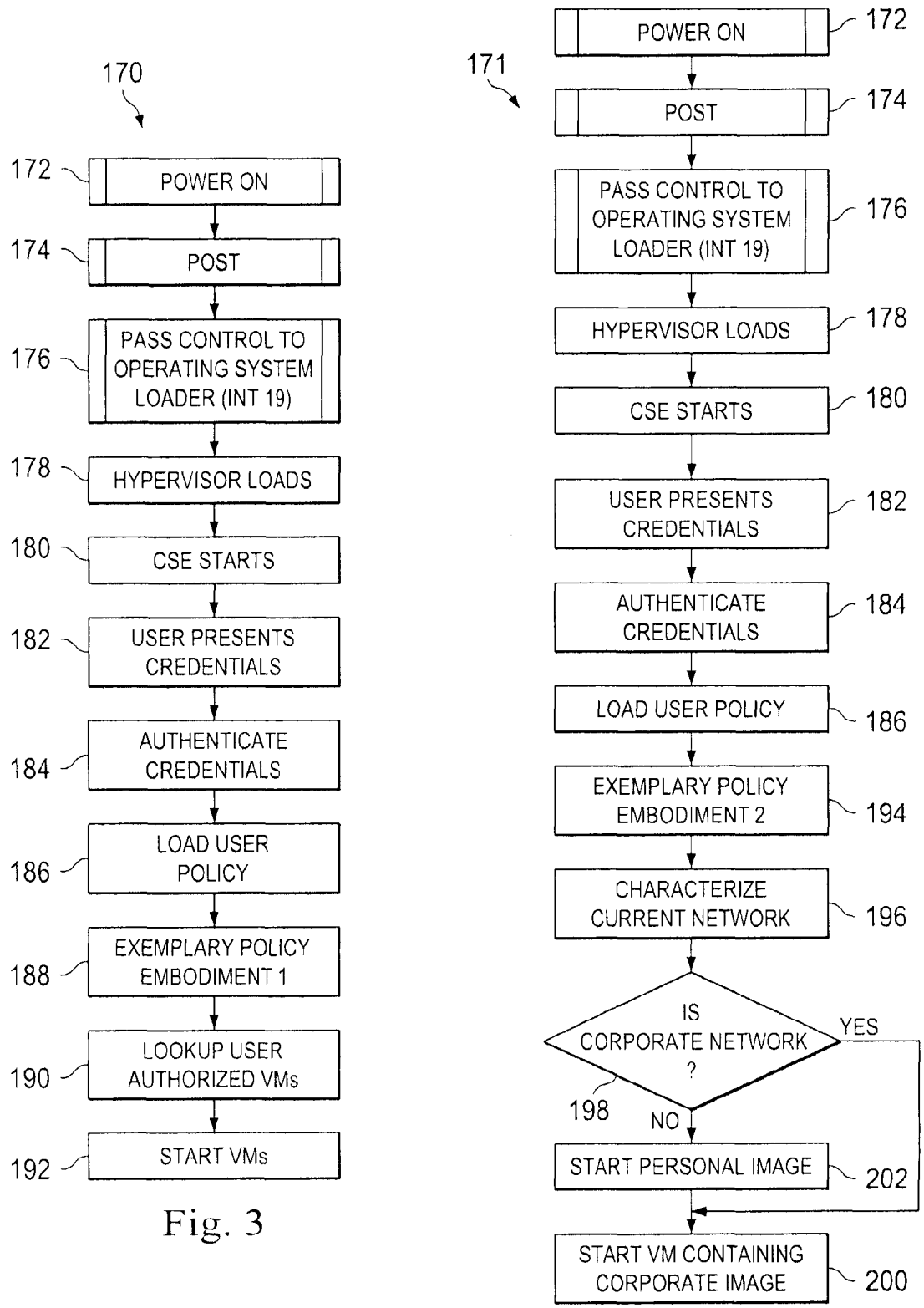
FIG. 3 illustrates a flow chart of an embodiment of a method for pre-boot authentication of a virtual appliance.
FIG. 4 illustrates a flow chart of an embodiment of a method for pre-boot authentication of a virtual appliance.

FIG. 3 illustrates a flow chart of an embodiment of a method 170 for pre-boot authentication of a virtual appliance, such as the virtual appliances 134, 136 and/or 138. The method begins at 172 when the IHS 100 is powered on. The method 170 proceeds to block 174 where the BIOS of the IHS 100 begins a power-on self test (POST) operation. The method 170 then proceeds to block 176 where the method 170 passes control of the IHS 100 to an operating system loader. The method 170 then proceeds to block 178 where the method 170 loads the hypervisor 132 and the hypervisor 132 begins operating on the IHS 100. The method 170 then proceeds to block 180 where the method 170 starts the CSE 140. The method 170 then proceeds to block 182 where the method 170 requests user credentials and the user presents their specific credentials. The method 170 then proceeds to block 184 where the method 170 authenticates the credentials presented by the user. The method 170 then proceeds to block 186 where the method loads a specific user policy from any number of possible user policies, wherein the specific user policy relates to the credentials presented by the user. The method 170 then proceeds to block 188 where the method 170 determines an exemplary policy for the specific user. The method 170 then proceeds to block 190 where the method 170 looks up authorized virtual machines for the specific user. For example, in an embodiment, the specific user (depending on credentials) may have a high level of security clearance and therefore may be able to access virtual machines 134, 136 and/or 138. On the other hand, the specific user (depending on credentials) may have a low level of security clearance and therefore may be able to only access virtual machine 134. Any combination of virtual machines may be available to the specific user. The method 170 then ends at block 192 after starting the virtual machines 134, 136 and/or 138 for which the specific user has access.

FIG. 4 illustrates a flow chart of an embodiment of a method 171 for pre-boot authentication of a virtual appliance, such as the virtual appliances 134, 136 and/or 138. The method begins at 172 when the IHS 100 is powered on and the method 171 continues substantially as that shown in blocks 172-186 of FIG. 3. The method 171 then proceeds from block 186 to block 194 where the method 171 determines an exemplary policy for the specific user. For example, in an embodiment, the specific user (depending on credentials) may have a high level of security clearance and therefore may be able to access virtual machines 134, 136 and/or 138. On the other hand, the specific user (depending on credentials) may have a low level of security clearance and therefore may be able to only access virtual machine 134. Any combination of virtual machines may be available to the specific user. The method 171 then proceeds to block 196 where the method characterizes a network environment which the IHS 100 is coupled. By characterizing the network, the method 171 may determine if the virtual machines 134, 136 and/or 138 should boot from a local drive or a remote drive. Characterizing the network also allows the method 171 to utilize other features of the network that should be readily apparent to a person of ordinary skill in the art. The method 171 then proceeds to decision block 198 where the method 171 determines whether the network is a corporate network. If yes, the network is a corporate network, the method ends at block 200 after starting a virtual machine comprising a corporate image, such as corporate image 148 on the IHS 100. If no, the network is not a corporate network, the method proceeds to block 202 where the method 171 starts a personal image, such as personal image 150 on the IHS 100. The method 171 then ends at block 200 after starting a virtual machine comprising a corporate image, such as corporate image 148 on the IHS 100.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A pre-boot authentication system, comprising:
   an information handling system (IHS) including IHS hardware coupled to at least one authentication component; and
   a non-transitory, computer-readable medium that is coupled to the IHS hardware and includes instructions that, when executed by a processor, cause the processor to provide a basic input/output system (BIOS), a hypervisor, and a concurrent service environment (CSE);
   wherein the BIOS is operable, in response to receiving a command to power-on the IHS, to pass control of the IHS to the hypervisor;
   wherein the hypervisor is operable to load the CSE; and
   wherein the CSE is operable to request user credentials, receive user credentials from the at least one authentication component, authenticate the received user credentials, determine an authorized operating system image from a plurality of operating system images using the authenticated user credentials, and instruct the hypervisor to boot the authorized operating system image.

2. The system of claim 1, wherein the authorized operating system image is a production operating system.

3. The system of claim 2, wherein the authorized operating system is a personal image.

4. The system of claim 2, wherein the authorized operating system is a corporate image.

5. The system of claim 1, wherein the authorized operating system image is a quick start operating system.

6. The system of claim 1, wherein the authorized operating system image loads from a remote drive.

7. The system of claim 1, wherein the hypervisor and the CSE are secure code systems.

8. An information handling system (IHS) comprising:
   a processor;
   an authentication component coupled to the processor;
   a non-transitory, computer-readable medium coupled to the processor and including instructions that, when executed by a processor, cause the processor to provide a basic input/output system (BIOS), a hypervisor, and a concurrent service environment (CSE);
   wherein the BIOS is operable, in response to receiving a command to power-on the IHS, to initialize a power-on self test (POST) and pass control of the IHS to the hypervisor;
   wherein the hypervisor is operable to load the CSE; and
   wherein the CSE is operable to request user credentials, receive user credentials from the authentication component, authenticate the received user credentials, determine an authorized operating system image from a plurality of operating system images using the authenticated user credentials, and instruct the hypervisor to run a first virtual machine of a plurality of virtual machines such that the authorized operating system image is booted subsequent to the authentication of the user credentials.

9. The IHS of claim 8, wherein the authorized operating system image is a production operating system.

10. The IHS of claim 9, wherein the authorized operating system is a personal image.

11. The IHS of claim 9, wherein the authorized operating system is a corporate image.

12. The IHS of claim 8, wherein the authorized operating system image is a quick start operating system.

13. The IHS of claim 8, wherein the authorized operating system image loads from a remote drive.

14. The IHS of claim 8, wherein the hypervisor and the CSE are secure code systems.

15. A method for pre-boot authentication, the method comprising:
   receiving, by a basic input-output system (BIOS), a command to power-on an information handling system (IHS);
   initializing, by the BIOS, a power-on self test (POST);
   passing control of the IHS by the BIOS to a hypervisor;

loading a concurrent service environment (CSE) by the hypervisor;

requesting user credentials by the CSE;

receiving user credentials by the CSE from an authentication component;

authenticating the received user credentials by the CSE;

determining, by the CSE, an authorized operating system image from a plurality of operating system images using the user credentials; and instructing the hypervisor to boot the authorized operating system image.

16. The method of claim 15, wherein the authorized operating system image is a production operating system.

17. The method of claim 16, wherein the authorized operating system is a personal image.

18. The method of claim 16, wherein the authorized operating system is a corporate image.

19. The method of claim 15, wherein the authorized operating system image is a quick start operating system.

20. The method of claim 15, wherein the authorized operating system image loads from a remote drive, and wherein the hypervisor and the CSE are secure code systems.

* * * * *